A. C. COBB.
AUTOMOBILE SIGNAL.
APPLICATION FILED MAR. 25, 1919. RENEWED JAN. 4, 1921.
1,386,597.
Patented Aug. 9, 1921.
2 SHEETS—SHEET 1.
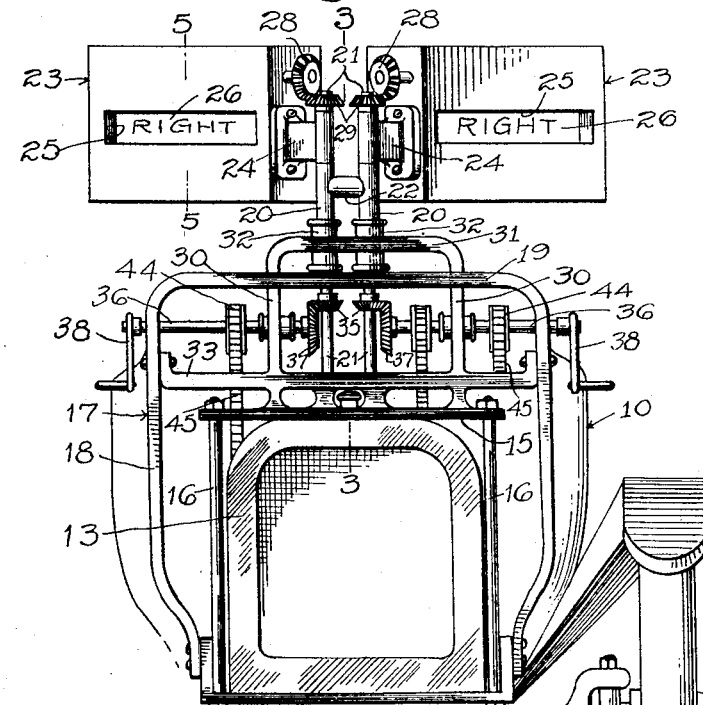
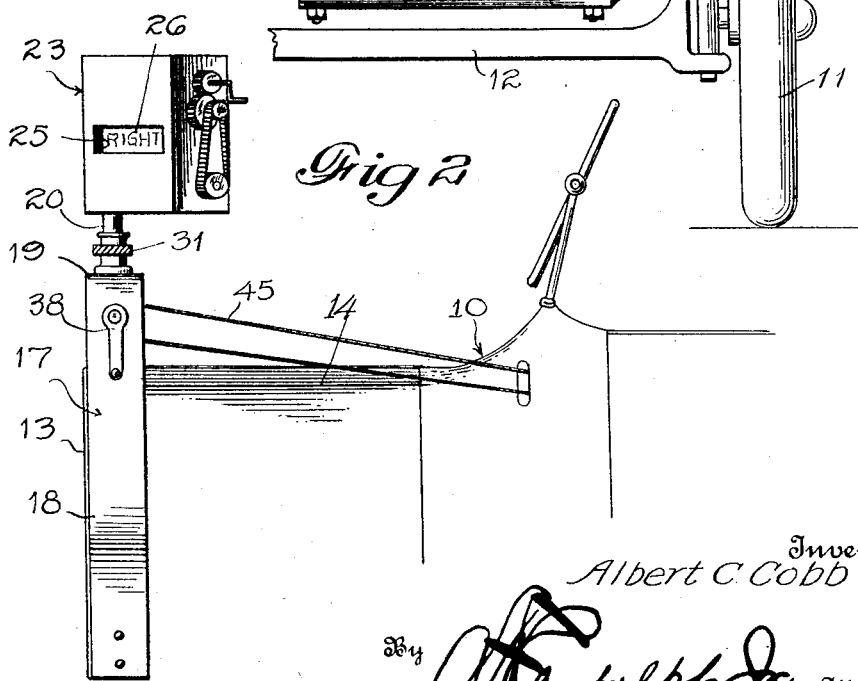
Inventor
Albert C Cobb
By
Attorney

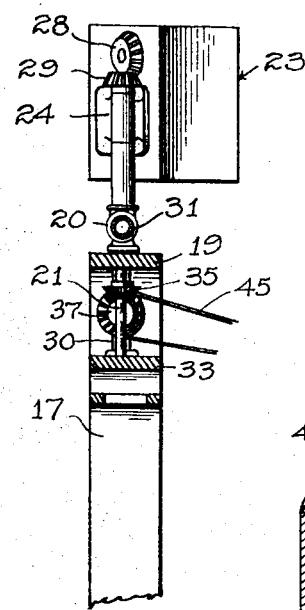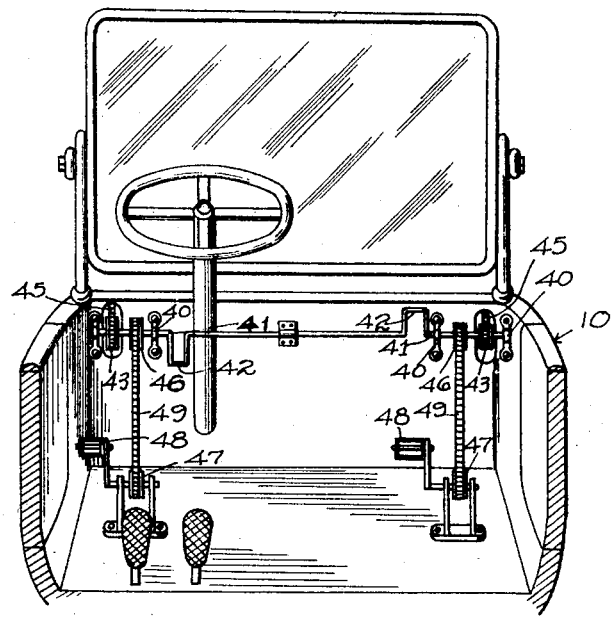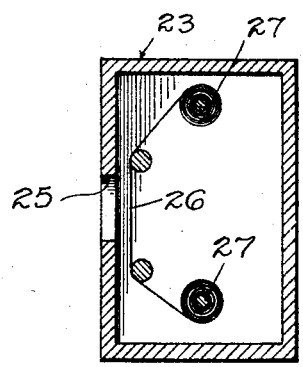

UNITED STATES PATENT OFFICE.

ALBERT C. COBB, OF HOUSTON, TEXAS.

AUTOMOBILE-SIGNAL.

1,386,597.      Specification of Letters Patent.      Patented Aug. 9, 1921.

Application filed March 25, 1919, Serial No. 285,110. Renewed January 4, 1921. Serial No. 435,010.

*To all whom it may concern:*

Be it known that I, ALBERT C. COBB, a citizen of the United States, residing at Houston, in the county of Harris and State of Texas, have invented certain new and useful Improvements in Automobile-Signals; and I do hereby declare the following to be a full, clear, and exact description of the invention, such as will enable others skilled in the art to which it appertains to make and use the same.

My invention relates to improvements in visual indicating signals, especially adapted for use in connection with motor vehicles.

An important object of this invention is to provide a visual indicator adapted to inform pedestrians and operators of motor vehicles of the direction a vehicle having my improved visual indicator is about to take.

A further object of the invention is to provide a signal of the character described which is easy to apply to a vehicle, cheap to manufacture and reliable in use.

Other objects and advantages of the invention will be apparent during the course of the following description.

In the accompanying drawings forming a part of this specification, and in which like numerals are employed to designate like parts throughout the same, Figure 1 is a front elevation of a motor vehicle, having my improved visual indicator applied thereto, Fig. 2 is a side elevation of the same, Fig. 3 is a longitudinal section taken on line 3—3 of Fig. 1, Fig. 4 is a vertical transverse section taken through the car adjacent the operator's seat, and showing the operating means for the signal, and, Fig. 5 is a section taken on line 5—5 of Fig. 1.

In the drawings wherein for the purpose of illustration is shown the preferred embodiment of my invention, the numeral 10 generally designates a motor vehicle having front wheels 11 connected by an axle 12. A radiator 13 is mounted above the axle and is arranged at one end of a hood 14. As clearly illustrated in Fig. 1, the radiator 13 has a supporting structure 15 secured thereto by stay-bolts 16. An arch generally designated by the numeral 17 is connected to the supporting member 15 and extends above the radiator as illustrated in Fig 1. The arch includes longitudinally curved arms 18 connected by a horizontal portion 19.

A pair of supporting standards 20 are secured to the horizontal portion 19 of the arch and receives a shaft 21. An arm 22 serves to rigidly connect the standards 20. As clearly shown in Fig. 1, indicators generally designated by the numeral 23 are secured to the standards 20 by arms 24. The casings 23 are positioned at approximately a 45 degree angle to the machine whereby persons not directly in front of the machine may have a full view of the casings upon the approach of a machine. The casings are provided with sight openings 25 which expose indicating curtains 26 having suitable direction indicating phrases printed thereon. The curtains 26 are mounted on rollers 27 positioned within the casings. One of the rollers in each casing is provided with a bevel gear 28 which is disposed exteriorly of the casing and meshes with bevel gears 29 carried by the upper ends of the shaft 21. Auxiliary supporting members 30 are secured to the member 15 and extend through the horizontal portion 19 for bracing the same. A connecting member 31 connects the upper ends of the bracing members 30 and is provided with bearing openings 32 for receiving the shaft 21 and forming bearing surfaces for the same. The longitudinally curved arms 18 of the arch 17 are connected intermediate their ends by horizontally disposed bearing plates 33. The lower ends of the shafts 21 are conical shape and are journaled in suitable bearing openings in the plate 33, to permit of the free rotation of the same.

The shafts 21 are provided with bevel gears 35 at points between the members 19 and 33. Horizontally disposed operating shafts 36 are journaled through the side members 18 of the arch 17 and the auxiliary supporting members 30. The bevel gears 35 mesh with coacting bevel gears 37 keyed to the shafts 36. Crank handles 38 are secured to the shafts 36 and are adapted for operating the signals from the front of the machine.

As clearly shown in Fig. 4, the dash board 39 of the vehicle is provided with a plurality of standards 40 rotatably receiving a shaft 41. A crank handle 42 is connected to the shafts 41 and is adapted for rotating the same. Sprocket wheels 43 and 44 are mounted on the shafts 41 and 36 respectively and have connection with sprocket chains 45. The sprocket wheels 43 are adapted to be operated for rotating the shafts 36 and consequently rotating the shafts 21. The rotation of the shafts 21 as is obvious causes the operation of the curtains 26 within the several casings. A second set of sprocket wheels 46 are connected with a coacting set of sprocket wheels 47 rotatably mounted on the floor of a vehicle. Operating elements 48 have connection with the sprocket wheels 47. Sprocket chains 49 serve to connect the several sets of sprocket wheels 46 and 47.

In the use of my invention, it will be apparent that the casings 23 are positioned above the radiator at an approximately 45 degree angle to the longitudinal axis of the car and operated through the various shafts and sprocket wheels described.

While I have shown and described the preferred embodiment of my invention, it is understood that I may make such minor changes in arrangement and construction of parts, as will remain within the spirit of the invention, and the scope of the appended claims.

Having thus described my invention, what I claim is:—

1. A signal of the character described comprising, a supporting member adapted to be secured to the radiator of a vehicle, an arched frame secured to said supporting member and extending above said radiator, a horizontal bracing element traversing said arched supporting member, a pair of shafts journaled through said arched supporting member and mounted on said horizontal supporting member, a pair of casings carried by said shafts, and means for operating said shafts whereby the casings are operated.

2. A signal of the character described comprising, a supporting member adapted to be secured to a radiator, an arched supporting frame connected with said supporting member, a horizontal bearing plate connected at its ends to said arched supporting member, a pair of vertically disposed shafts journaled through said arched supporting member and mounted on said bearing plate, a pair of horizontally disposed shafts carried by said arched supporting member and having connection with said shafts, a pair of visual indicators mounted on said shafts, and means to operate said horizontal shafts.

3. A signal of the character described comprising, a supporting frame, an arched frame connected with said supporting frame, a pair of vertical shafts carried by said arched frame, a pair of visual indicators carried by said shafts, a pair of horizontal shafts carried by said arched frame and having connection with said vertical shafts, crank handles mounted on the ends of said horizontal shafts, and secondary means coacting with said crank handles for operating said visual indicators.

In testimony whereof I affix my signature in presence of two witnesses.

ALBERT $\overset{\text{his}}{\times}$ C. COBB.
mark

Witnesses:
O. J. COBB,
E. H. HALL.